US011868235B2

(12) United States Patent
Ranka et al.

(10) Patent No.: US 11,868,235 B2
(45) Date of Patent: Jan. 9, 2024

(54) WORKFLOW ERROR DEBUGGER

(71) Applicant: HEWLETT PACKARD ENTERPRISE DEVELOPMENT LP, Houston, TX (US)

(72) Inventors: Akshar Kumar Ranka, Santa Clara, CA (US); Nitish Midha, Santa Clara, CA (US); Christopher Wild, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 190 days.

(21) Appl. No.: 17/382,062

(22) Filed: Jul. 21, 2021

(65) Prior Publication Data
US 2023/0034587 A1   Feb. 2, 2023

(51) Int. Cl.
*G06F 11/07* (2006.01)
*G06F 11/36* (2006.01)
*G06F 16/22* (2019.01)

(52) U.S. Cl.
CPC ........ *G06F 11/362* (2013.01); *G06F 11/0751* (2013.01); *G06F 16/2228* (2019.01)

(58) Field of Classification Search
CPC .. G06F 11/362; G06F 11/0766; G06F 11/302; G06F 11/3466; G06F 11/3476; G06F 11/0751; G06F 11/0793; G06F 11/079
See application file for complete search history.

(56) References Cited

U.S. PATENT DOCUMENTS

| 10,230,571 | B2  |   | 3/2019  | Rangasamy et al. |
|------------|-----|---|---------|-------------------|
| 10,489,179 | B1  |   | 11/2019 | Mackay et al.     |
| 2010/0306777 | A1 | * | 12/2010 | Mohanty ............ G06F 11/3476 718/102 |
| 2020/0328952 | A1 |   | 10/2020 | Makwarth et al.   |
| 2020/0348995 | A1 | * | 11/2020 | Venkataraman .... G06F 11/0793 |

(Continued)

OTHER PUBLICATIONS

Eyee, U., "Monitoring Containerized Microservices with a Centralized Logging Architecture," Sep. 6, 2018, https://hackernoon.com/monitoring-containerized-microservices-with-a-centralized-logging-architecture-ba6771c1971a.

(Continued)

*Primary Examiner* — Yolanda L Wilson
(74) *Attorney, Agent, or Firm* — Hewlett Packard Enterprise Patent Department

(57) ABSTRACT

Examples include aggregating logs, where each of the logs is associated with a workflow instance. Each log includes information indicative of an event occurring during the workflow instance. Further, examples include assigning, based on user intent of the workflow instance, a workflow name to each log, where the user intent is indicative of an outcome of execution of the workflow instance and assigning an instance identifier to each log, where the instance identifier corresponds to the workflow instance. Further, identifying a subset of the plurality of logs having an identical workflow name and an identical instance identifier, associating a tracking identifier to the subset, and creating an index of processed logs, wherein each processed log in the index includes the tracking identifier. Further, analyzing the index of processed logs based on a set of rules and identifying, based on the analysis, an error in execution of each the workflow instance.

20 Claims, 8 Drawing Sheets

(56) References Cited

U.S. PATENT DOCUMENTS

2021/0097385 A1    4/2021    Gupta et al.
2021/0133078 A1*    5/2021    Kunnath ............... G06F 11/323
2022/0245012 A1*    8/2022    Grimes ............... G06F 11/0787

OTHER PUBLICATIONS

Naikade, P. P. et al., "Automated Anomaly Detection and Localization System for a Microservices Based Cloud System," Jul. 17, 2020, https://ir.lib.uwo.ca/cgi/viewcontent.cgi?article=9560&context=etd.

Sematext Group, "Log Analysis: A Complete Guide Covering From What It Is, Use Cases & Best Practices You Need to Know About," Sep. 18, 2020, https://sematext.com/blog/log-analysis/.

"Grok Patterns: Portal-StreamSets Docs", online avaialble at <https://docs.streamsets.com/portal/datacollector/latest/help/datacollector/UserGuide/Apx-GrokPatterns/GrokPatterns_title.html>, retrieved on Jan. 25, 2022, 5 pages.

"grok-patterns", online available at <https://web.archive.org/web/20210115083947/https://github.com/logstash-plugins/logstash-patterns-core/blob/master/patterns/grok-patterns>, retrieved on Jan. 25, 2022, 3 pages.

"Retool:Build internal tools, remarkably fast", online available at <https://retool.com/in>, retrieved on Jan. 25, 2022, 9 pages.

"Structure of a Config File", online available at <https://www.elastic.co/guide/en/logstash/5.6/configuration-file-structure.html#configuration-file-structure>, retrieved on Jan. 25, 2022, 5 pages.

Mahmud, T., et al., "A rule based approach for NLP based query processing," 2nd International Conference on Electrical Information and Communication Technologies (EICT), Dec. 2015, pp. 78-82.

Schnitzer, J., "How can I export/import Dashboards, Searches and Visualizations from my own Kibana?", online available at <https://support.logz.io/hc/en-us/articles/210207225-How-can-I-export-import-Dashboards-Searches-and-Visualizations-from-my-own-Kibana-4>, retrieved on Jan. 25, 2022, 3 pages.

\* cited by examiner

| Source | Timestamp | Service Name | Message |
|---|---|---|---|
| {"Workflow1"} | Jul 1, 2021 2:16 pm | config_ui_api | HandleEventBusResponse encoding |
| {"Workflow2"} | Jul 1, 2021 2:16 pm | scan_ui_api | FacialRecogEvent Handler |
| {"Workflow1"} | Jul 1, 2021 2:16 pm | customer_db_api | SolutionConfigHandler |
| {"Workflow2"} | Jul 1, 2021 2:17 pm | config_ui_api | GetMatchResponse |
| {"Workflow1"} | Jul 1, 2021 2:17 pm | customer_db_api | SolutionConfigHandler |

FIG. 3A

| Source | Timestamp | Service Name | Tracking Identifier | Instance Identifier | Subset | Workflow name | Message |
|---|---|---|---|---|---|---|---|
| {"Workflow1"} | Jul 1, 2021 2:16 pm | config_ui_api | ReadAllExpressSolutions42 | 2662f0c41859cbcb0d0a9a354cfe87d5 | Subset 1 | ReadAllExpressSolutions | HandleEventBusResponseencoding |
| {"Workflow2"} | Jul 1, 2021 2:16 pm | scan_ui_api | LivenessCheck100 | b1fcac41859cbcb0d0a9a354cfe0f37 | Subset 2 | LivenessCheck | FacialRecogEventHandler |
| {"Workflow1"} | Jul 1, 2021 2:16 pm | customer_db_api | ReadAllExpressSolutions42 | 2662f0c41859cbcb0d0a9a354cfe87d5 | Subset 1 | ReadAllExpressSolutions | SolutionConfigHandler |
| {"Workflow2"} | Jul 1, 2021 2:17 pm | config_ui_api | LivenessCheck100 | b1fcac41859cbcb0d0a9a354cfe0f37 | Subset 2 | LivenessCheck | GetMatchResponse |
| {"Workflow1"} | Jul 1, 2021 2:17 pm | customer_db_api | ReadAllExpressSolutions42 | 2662f0c41859cbcb0d0a9a354cfe87d5 | Subset 1 | ReadAllExpressSolutions | SolutionConfigHandler |

FIG. 3B

Index1

| Source | Timestamp | Service Name | Tracking Identifier | Instance Identifier | Workflow name | Message |
|---|---|---|---|---|---|---|
| {"Workflow1"} | Jul 1, 2021 2:16 pm | config_ui_api | ReadAllExpressSolutions42 | 26620c41859cbcb0d0a9a354cfe87d5 | ReadAllExpressSolutions | HandleEventBusResponse encoding |
| {"Workflow1"} | Jul 1, 2021 2:16 pm | customer_db_api | ReadAllExpressSolutions42 | 26620c41859cbcb0d0a9a354cfe87d5 | ReadAllExpressSolutions | SolutionConfigHandler |
| {"Workflow1"} | Jul 1, 2021 2:17 pm | customer_db_api | ReadAllExpressSolutions42 | 26620c41859cbcb0d0a9a354cfe87d5 | ReadAllExpressSolutions | SolutionConfigHandler |

Index2

| Source | Timestamp | Service Name | Tracking Identifier | Instance Identifier | Workflow name | Message |
|---|---|---|---|---|---|---|
| {"Workflow2"} | Jul 1, 2021 2:16 pm | scan_ui_api | LivenessCheck100 | b1fcac41859cbcb0d0a9a354cfe0f37 | LivenessCheck | FacialRecogEventHandler |
| {"Workflow2"} | Jul 1, 2021 2:17 pm | config_ui_api | LivenessCheck100 | b1fcac41859cbcb0d0a9a354cfe0f37 | LivenessCheck | GetMatchResponse |

FIG. 3C

WORKFLOW ERROR DEBUGGER

BACKGROUND

Networks may include a plurality of resources connected by communication links, and may be used to connect people, provide services (e.g., internally and/or externally via the Internet and/or intranet), and/or organize information, among other activities associated with an entity. Users may perform various activities through the network. Different activities may be organized in workflows.

A workflow refers to a sequence of tasks that processes a set of data. Workflows occur across every kind of business and industry. Workflows can help streamline and automate repeatable business tasks, minimizing room for errors and increasing overall efficiency. Workflows may include processes invoked by a user at a user device or an edge device and may span up to servers in a data center. Thus, a workflow may involve processes, services, applications, executed in multiple devices running multiple applications and services.

BRIEF DESCRIPTION OF THE DRAWINGS

The following detailed description references the drawings, wherein:

FIGS. 3A, 3B, and 3C illustrate logs aggregated and processed, according to some examples;

DETAILED DESCRIPTION

Figure 1:
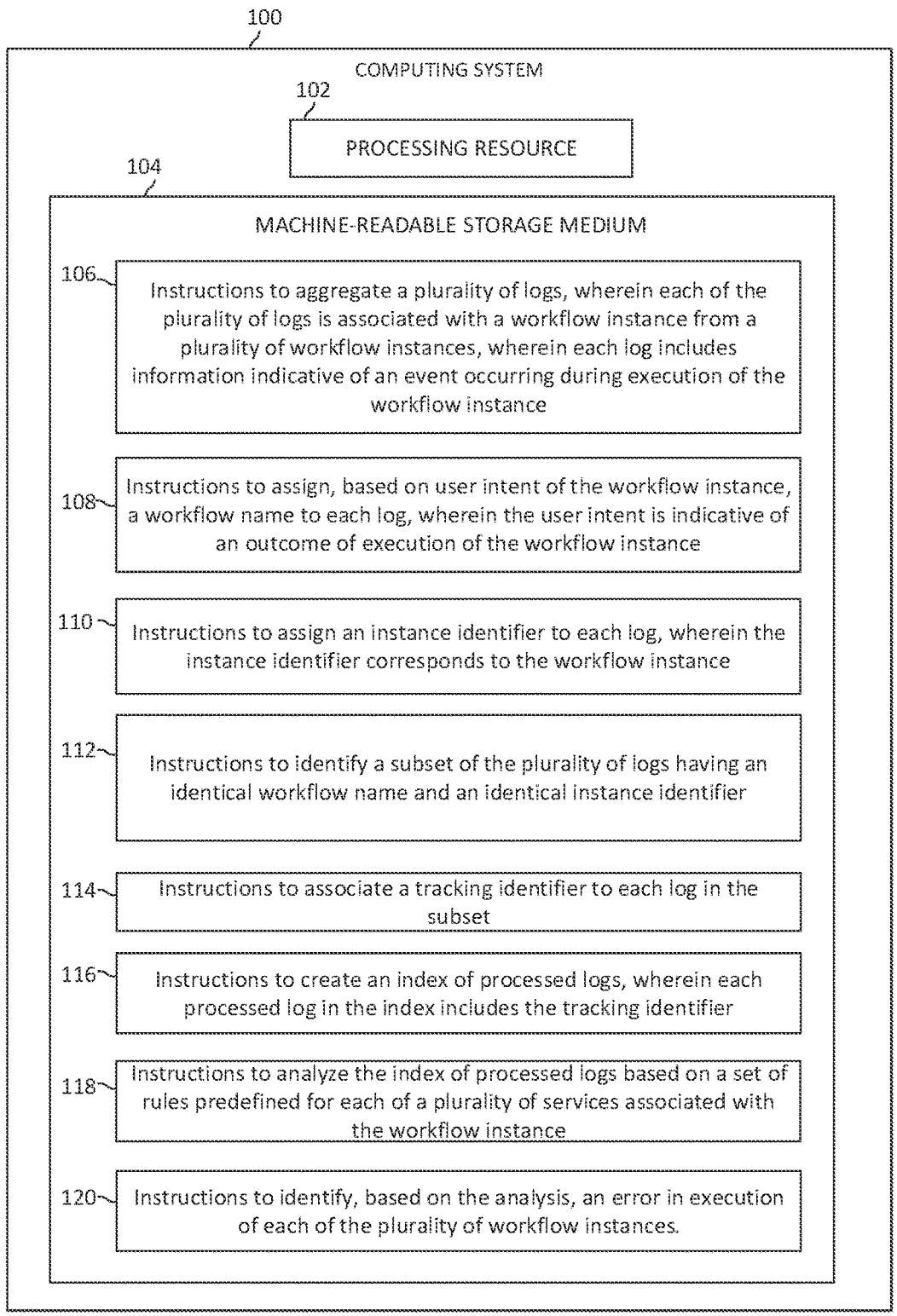
FIG. 1 is a block diagram of a computing system for debugging workflows, according to some examples.

Workflows may span across multiple services and applications deployed in multiple compute environments. In some examples, a workflow may invoke multiple microservices hosted in containers managed by a container orchestration platform. Because multiple applications and/or services running in multiple host devices may be involved in a workflow it may be challenging to identify failure and errors associated with a workflow. Further, there may be multiple instances of execution, i.e. multiple running copies of a single workflow which may be initialized at different times. Thus, application developers and Quality Assessment (QA) personnel often face issues while debugging errors that occur in workflow execution. Further, in some examples, with workflows running in a combination of microservices deployed in containers managed by a container orchestration platform, it may be challenging to identify failure and errors associated with different instances of execution of a workflow having multiple microservices associated with a single instance of execution of the workflow. For example, in a microservice environment with multiple, auto-scaled pods/containers per microservice, identifying a failed workflow with multiple associated microservices can be cumbersome. This is because, a request of host A of service 1 can be propagated to host C of service 2 and subsequently to host N of service N. The involvement of multiple host devices and services makes identification and debugging of errors complex. Thus, error debugging in workflows may be time consuming and may involve significant manual effort of the user to identify malfunction in applications/services, etc., which resulted in the error.

The techniques disclosed herein provide aggregated user-friendly views for error debugging with comprehensive error reports associated with microservices involved in a workflow. In an example, a computing system may aggregate a plurality of logs, where each of the plurality of logs is associated with a workflow instance from a plurality of workflow instances. The log includes information indicative of an event occurring during execution of the workflow instance. The computing system may assign, based on user intent of the workflow instance, a workflow name to the log. The user intent is indicative of an outcome of execution of the workflow instance. In an example, the user intent may be derived from one or more user inputs to Application Programming Interfaces (APIs) initiating the workflow instance. The computing system may further assign an instance identifier to the log. The instance identifier corresponds to the workflow instance and represents a running copy of the workflow. The computing system may further identify a subset of the plurality of logs having an identical workflow name and an identical instance identifier and associate a tracking identifier to each log in the subset. Further, the computing system creates an index of processed logs, where each processed log in the index includes the tracking identifier. The index of processed logs is analyzed based on a set of rules predefined for each of a plurality of services associated with the workflow instance. Based on the analysis, the computing system may identify an error in execution of each of the plurality of workflow instances. Hence, according to the techniques taught by this disclosure, logs associated with multiple services/applications involved in a workflow instance is stitched together using the tracking identifier. Based on the tracking identifier, all logs associated with a single workflow instance may be grouped and queried using the tracking identifier. The workflow instance may be analyzed end to end to determine if there is an error or failure in any of the microservices associated with the workflow. Thus, an aggregated view of error(s) during execution of a workflow instance may be rendered, where the errors may be due to failures in one or more microservices associated with the workflow. This may reduce complexity and manual effort in error debugging.

Referring now to the drawings, FIG. 1 is a block diagram of an example computing system 100 for debugging workflows. In an example, the computing system 100, also referred to as the system 100 may be a compute instance in a computing cluster managed by a container orchestration system. For example, the computing system 100 may be a "pod" in a Kubernetes cluster. The Kubernetes cluster may deploy, scale, and manage computing instances in the cluster. The pods refer to individually deployable objects in a Kubernetes cluster. A pod represents a single instance of a running process in the cluster. In some examples, pods contain one or more containers, such as docker containers. When a pod runs multiple containers, the containers are managed as a single entity and share the pod's resources. Pods also contain shared networking and storage resources for their containers. Pods are automatically assigned unique IP addresses. Containers in a pod share the same network namespace, including IP address and network ports. Containers in a Pod communicate with each other inside the Pod on local host. Pods can specify a set of shared storage volumes that can be shared among the containers. A container refers to a software package that includes instructions and all its dependencies for running an application in different computing environments. Containers are isolated from one another and bundle their own software, libraries and configuration files. They can communicate with each other through well-defined channels.

The system 100 includes a processing resource 102 and a machine-readable storage medium 104. Machine-readable storage medium 104 may be in the form of non-transitory machine-readable storage medium, such as suitable electronic, magnetic, optical, or other physical storage apparatus to contain or store information such as instructions 106-120, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 106 to 120 are stored (encoded) on storage medium 104 and are executable by processing resource 101 to implement functionalities described herein in relation to FIG. 1. In some examples, storage medium 110 may include additional instructions, like, for example, the instructions to implement some of the functionalities described in relation to system 200 in FIG. 2 or computing device 600 in FIG. 6. In other examples, the functionalities of any of the instructions of storage medium 104 may be implemented in the form of electronic circuitry, in the form of executable instructions encoded on machine-readable storage medium, or a combination thereof.

Processing resource 102 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 106 to 120, as described herein.

The instructions 106 when executed by the processing resource 102 may cause the system 100 to aggregate a plurality of logs, where each of the plurality of logs is associated with a workflow instance. A log may represent a computer file that records events that occur during execution of instructions in a device. In some examples, the log may originate from an application or a microservice hosted in a computing cluster. A microservice packages a single application as a collection of loosely coupled and independently deployable components or services. In some examples, the services communicate with one another over a combination of Representational State Transfer (REST) APIs, event streaming, and message brokers and are organized by business capability.

A workflow refers to a sequence of tasks that processes a set of data. Workflows occur across every kind of business and industry. Workflows can help streamline and automate repeatable business tasks, minimizing room for errors and increasing overall efficiency. In an example, the workflow may be a datacenter workflow which involves the processes by which datacenter tasks are performed in an orderly and efficient manner. It is the sequence of tasks which ensures that all changes are made consistently and accurately. In some examples, a single workflow may involve executing multiple microservices to obtain an outcome. During execution of the workflow, a microservice may execute a portion of the workflow and communicate with another microservice to implement its associated functionality. Also, a single workflow may be executed multiple times during performance of a business process. Each time the workflow is executed, a separate instance of the workflow may be invoked. A workflow instance refers to a single copy of a running workflow. Multiple instances of a workflow refers to the workflow that has been loaded into the memory several times.

The system 100 may aggregate the logs from a plurality of workflow instances. The workflow instances may include instances of a single (i.e. the same) workflow or instances of different workflows. Each of the logs include information indicative of an event occurring during execution of the workflow instance associated with the log. The events may include transactions between applications or microservices, etc., involved in the workflow. The events collected in the log may include the type, content, or time of the transactions made by a user from a terminal with that microservice or application. Examples of the events may include error messages, completion messages, installation successful messages, transaction information between the microservices, etc. Aggregating the logs may include storing the logs in a centralized distributed database (not shown) accessible by the computing system 100.

The instructions 108 when executed by the processing resource 102 may cause the system 100 to assign a workflow name to each of the logs based on user intent of the workflow instance. The user intent is indicative of an outcome of execution of the workflow instance. In an example, user intent refers to a business outcome associated with the workflow instance. For example, for a workflow related to opening a new customer account, the user may provide inputs such as customer name, type, contact, etc., to open the customer account. The inputs may be provided at the time of initialization of the workflow. Based on the inputs to the workflow, a workflow name, such as "NewCustomer", may be assigned to the log corresponding to that workflow. The workflow name allows logs of different workflows to be distinguished from one another.

The instructions 110 when executed by the processing resource 102 may cause the system 100 to assign an instance identifier to the log, where the instance identifier corresponds to the workflow instance. For example, when a workflow is initialized for the first time, a first workflow instance may be running. In an example with reference to the workflow to open a new customer account, the first invoked workflow instance may be assigned an instance identifier "1". Thus, the workflow instance may be identified as "NewCustomer1". Similarly, subsequently invoked workflow instances of the workflow may be assigned a respective instance identifier (e.g., "NewCustomer2", "NewCustomer3", etc.). In an example, the instance identifier may be a randomly generated numerical associated with the workflow name that is unique to a workflow instance. The assignment of workflow name and instance identifier is done for each log from the plurality of logs that are aggregated.

The instructions 112 when executed by the processing resource 102 may cause the system 100 to identify a subset of the plurality of logs having an identical workflow name and an identical instance identifier. The subset of logs include logs that may be generated as part of a single transaction, i.e., which are generated by a single instance of a particular workflow. Identification of the subset of logs enables stitching together logs referring to a particular transaction or process that invokes a single instance of a particular workflow. The subset of logs also allows for grouping logs across multiple microservices/processes in a single workflow instance. These logs in one subset may include information relating to events occurring during execution of a single instance of a particular workflow.

The instructions 114 when executed by the processing resource 102 may cause the system 100 to associate a tracking identifier to each log in the subset of logs. The tracking identifier may be a universally unique identifier (UUID) used to differentiate logs of one subset from logs of another subset. The tracking identifier may be a user-friendly alpha-numeric name associated with the subset of logs.

The instructions 116 when executed by the processing resource 102 may cause the system 100 to create an index of processed logs, where each processed log in the index includes the tracking identifier. The index of processed logs refers to a collection of the subset of logs. Thus, for each subset of logs there may be a separate index of processed logs. The index of processed logs is grouped using the tracking identifier. Each index of processed logs may be identified by a single tracking identifier that is common for all logs in the index.

The instructions 118 when executed by the processing resource 102 may cause the system 100 to analyze the index of processed logs based on a set of rules predefined for each of a plurality of services associated with the workflow instance. Each of the applications/services/microservices that may be executed while running of the workflow instance may have a set of rules for error checking. If the workflow instance invokes multiple microservices during execution, a set of rules corresponding to each of those microservices is used for analyzing the processed logs. Based on the analysis, the instructions 120 when executed by the processing resource 102 may cause the system 100 to may identify an error in execution of each of the plurality of workflow instances.

Figure 2:
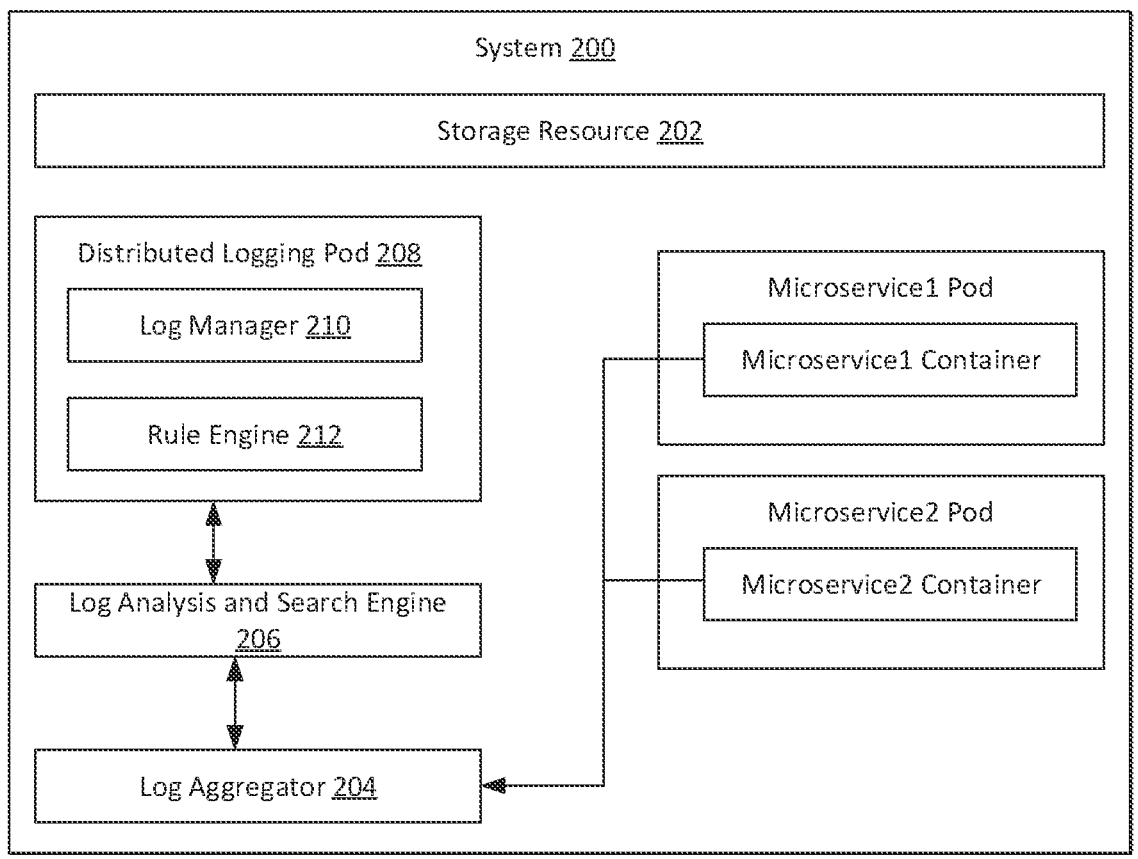
FIG. 2 illustrates a block diagram of a system environment for debugging workflows, according to some examples.
Figure 6:
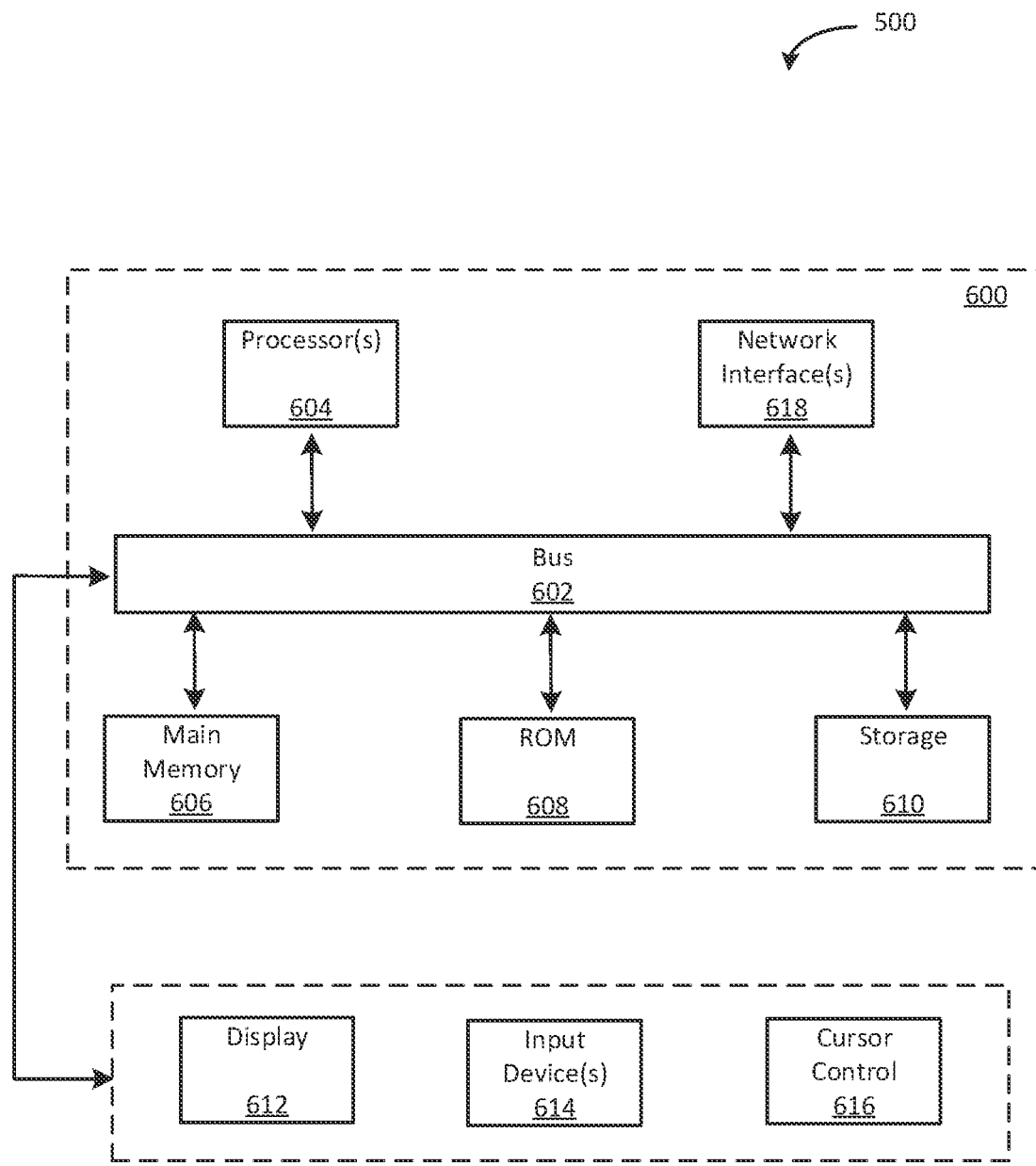
FIG. 6 depicts a block diagram of a computer system in which the embodiments described herein may be implemented, according to some examples.

Computing system 100 of FIG. 1, which is described in terms of processors and machine-readable storage mediums, can include one or more structural or functional aspects of system 200 of FIG. 2, or computer system 600 of FIG. 6.

FIG. 2 is a block diagram of an example system 200 for debugging workflows. System 200 may be deployed on a container orchestration platform, such as a Kubernetes cluster. In an example, the Kubernetes cluster may include a set of compute nodes for running containerized applications. The cluster may include a control plane and one or more compute machines, or nodes. The storage resource 202 may include a persistent storage for storing data processed by pods and/or containers in the container orchestration platform. In an example, the storage resource 202 may include a Kubernetes volume. The Kubernetes volume represents a directory that contains data accessible to containers in a particular pod in the container orchestration platform.

The system 200 may further include a log aggregator 204. In an example, the log aggregator 204 may be a separate container executing a data processing pipeline that can ingest data records in different formats from multiple sources and may transform the data records into a predefined format. In some examples, the log aggregator 204 may be implemented as instructions in a separate pod in the Kubernetes cluster. Thus, aggregating the logs may include converting the logs into the predefined format. In an example, the log aggregator 204 may ingest logs from multiple microservices, such as microservice1 and microservice2 and may transform the data into a json format. In an example, the data processing pipeline may be implemented as a Logstash container. The data processing pipeline may be centrally deployed in the system 200 and may communicate with each pod in the cluster to collect their respective logs. In some other examples, the data processing pipeline implemented as the logstash container may be deployed in each of the individual pods, such as microservice1 pod and microservice2 pod. Although not shown in FIG. 2, in an example, the logstash container deployed in each of the individual microservice pods may push the logs of their respective microservices into a log analyzer and search engine 206. In an example, the logs may be aggregated from a plurality of microservices, such as microservice1 and microservice2 deployed in the system 200. The microservice1 and microservice2 may be associated with a single workflow or different workflows.

The log analysis and search engine 206 may receive the logs from the log aggregator 204. The log analysis and search engine 206 may store the logs and allow the logs to be searched based on user inputs. In an example, the aggregated logs may be stored in the log analysis and search engine 206, such as Elasticsearch, which allows the logs to be searched and displayed using a user interface. In an example, the log analysis and search engine 206 may include instructions implementing a distributed, multitenant-capable full-text search engine with an HTTP web interface and schema-free JavaScript Object Notation (JSON) documents. The log analysis and search engine 206 may be implemented in a Kubernetes cluster within a separate container or group of containers.

For example, a workflow may be executed by a user for biometric (facial) recognition. Based on user inputs, microservice1 and microservice2 are invoked for that workflow. The log aggregator 204 may pull all the logs from the microservices 1 and 2. The aggregated logs may be in the form of a list or index having a date of transaction mentioned in the entries of the logs. In an example, the log aggregator 204 may format the logs using filters and transmit the indices to the log analysis and search engine 206.

The log analysis and search engine 206 interacts with a distributed logging pod 208. The distributed logging pod 208 is deployed in a separate pod and includes a log manager 210 and a rule engine 212. The log manager 210 may include instructions for managing logs implemented in a separate container within the distributed logging pod 208. The log manager 210 may access the logs from the log analysis and search engine 206. The log manager 210 may assign a workflow name to each of the logs. The workflow name may be assigned to a log based on user intent of the workflow. The user intent is indicative of an outcome of execution of the workflow instance. In an example, the user invoking the workflow instance may provide specific inputs based on which the user intent may be determined. In the example workflow for biometric (facial) recognition, depending on biometric/facial inputs from the user, the user intent of being identified based on the biometric/facial inputs may be determined. Based on the determined user intent, the log manager 210 may assign a workflow name, such as, "LivenessCheck" to a first log generated from a REST request to the microservices 1 or 2. The workflow name may be predefined and mapped to a user input or a set of user inputs.

The log manager 210 may further assign an instance identifier to the log. In an example, the instance identifier may be a user friendly UUID corresponding to the workflow instance. The instance identifier is different for each workflow instance. Thus, different instances of the same workflow have different instance identifiers. In the example, logs arising from microservices 1 and 2 associated with the same workflow instance is assigned an identical instance identifier. In an example, on invoking the workflow instance, the microservice 1 may be executed (called) via a request to a REST API associated with the microservice 1. On receiving the request, the microservice 1 may associate a mapping information with logs generated as a result of execution of the microservice 1. The mapping information may be generated based on a timestamp of the generated logs. After execution of microservice 1, the microservice 1 may invoke the microservice 2 as part of the workflow instance. While invoking the microservice 2, the microservice 1 forwards the mapping information to the microservice 2 using streaming platforms, such as REST or Kafka. Microservice 2 includes the mapping information in all logs originating as a result of execution of microservice 2 in the workflow instance. Thus, logs generated from different microservices during execution of a single workflow instance have a common mapping information. Based on the common mapping information included in the aggregated logs, the log manager 210 may assign an identical instance identifier to logs originating from microservice 1 and microservice 2 while execution of the same workflow instance. Thus, the instance identifier allows logs from different microservices generated while execution of a single workflow instance to be associated with each other. In an example, the instance identifier may include a randomly generated alphanumeric code. In an example, when the microservice1 is invoked during execution of a workflow instance for biometric/facial recognition, an instance identifier, say, "40 2662f0c41859cbcb0d0a9a354cfe87d5" may be associated with all logs from a series of logs originating from the microservice1. Subsequently, during execution of the same workflow instance when microservice2 is invoked, the same instance identifier, "2662f0c41859cbcb0d0a9a354cfe87d5" may be associated with all logs from a series of logs originating from the microservice2. Thus, the same instance identifier is assigned to logs of a single workflow instance that invokes different microservices.

The log manager 210 may identify a subset of the plurality of logs having an identical workflow name and an identical instance identifier. Thus, in an example, all logs of the workflow "LivenessCheck" having instance identifier "2662f0c41859cbcb0d0a9a354cfe87d5" may be grouped in the subset. The logs grouped in the subset represents all logs generated by one or more microservices during execution of a single workflow instance. Thus, the subset of logs provides a comprehensive collection of logs generated during an operation of a particular workflow instance.

The log manager 210 associates a tracking identifier to each log in the subset. The tracking identifier may be a user-friendly UUID associated with all logs in the subset. In the example workflow described above, the tracking identifier associated with the subset may be "LivenessCheck42". The tracking identifier is unique to each subset of logs. The logs in the subset may be queried based on the tracking identifier.

The log manager 210 creates an index of processed logs using multiple subsets of logs. Thus, each processed log in the index includes the tracking identifier. The processed logs represent subsets of logs associated with respective tracking identifiers. The log manager 210 may transmit the processed logs to the log analysis and search engine 206 which may arrange the processed logs based on one of workflow name, instance identifier, and tracking identifier. The log analysis and search engine 206 allows the processed logs to be queried using one of the workflow name, instance identifier, and tracking identifier. In response to a query indicative of the tracking identifier, log analysis and search engine 206 may generate a list of all logs in the subset associated with the tracking identifier. For example, in response to a query indicative of the tracking identifier "LivenessCheck42" all logs associated with the workflow for biometric/facial recognition having an instance identifier "2662f0c41859cbcb0d0a9a354cfe87d5" may be generated in a list.

FIG. 3A illustrates an example of logs aggregated from multiple microservices involved in multiple workflows. Table 300 shown in FIG. 3A, includes a plurality of logs that are aggregated. Each of the plurality of logs is associated with a workflow instance, such as "Workflow1" or "Workflow2". The "source" field in each log is indicative of an instance of a workflow being invoked by user action. For example, a workflow for biometric (facial) recognition, such as "workflow2" in the example of FIG. 3A, may be invoked on receiving a facial scan of the user. Once the "workflow2" is invoked, a path including a string of characters used to uniquely identify a location of the "workflow2" in a directory structure may be listed in the "source" field. The "timestamp" field indicates a time instance when an application/service/microservice involved in the workflow is executed. As described earlier, the logs in the table 300 may be periodically aggregated by a log aggregator, such as the log aggregator 204, from a plurality of microservices. Table 300 shows logs aggregated from three different microservices, such as "cofig_ui_api", "scan_ui_api", and "customer_db_api". Each of the logs also include a "service name" field which identifies the microservice which is executed to perform an action or set of actions in the workflow. The "message" field in each log includes information indicative of an event occurring during execution of the workflow instance with which the log is associated.

The log manager 210 may assign a workflow name to each of the logs. As shown in FIG. 3B, "ReadAllExpressSolutions" is the workflow name assigned to each of the logs originating from "Workflow1" and "LivenessCheck" is the workflow name assigned to each of the logs originating from "Workflow2". Further, the log manager 210 may also assign an instance identifier to each of the logs. An instance identifier "2662f0c41859cbcb0d0a9a354cfe87d5" is assigned to the workflow instance "workflow1" and an instance identifier "b1fcac41859cbcb0d0a9a354cfe0f37" is assigned to the workflow instance "workflow2".

Further, the log manager 210 identifies logs having workflow name "ReadAllExpressSolutions" and instance identifier "2662f0c41859cbcb0d0a9a354cfe87d5" as subset 1 and logs having workflow name "LivenessCheck" and instance identifier "b1fcac41859cbcb0d0a9a354cfe0f37" as subset 2.

The log manager 210 associates a tracking identifier "ReadExpressSolutions42" to each of the logs in the subset 1 and a tracking identifier "LivenessCheck100" to each of the logs in the subset 2. Further, based on the tracking identifiers, the log manager 210 may create an index of processed logs, where each processed log in the same index includes identical tracking identifier. Thus, as shown in FIG. 3C, logs with tracking identifier "ReadExpressSolutions42" are grouped in "Index1" and logs with tracking identifier "LivenessCheck100" are grouped in "Index2". Also, it may be noted from "Index1" and "Index2" in FIG. 3C, that logs of the same microservice "config_ui_api" executed by different workflows, viz. "ReadAllExpressSolutions" and "LivenessCheck" is separately grouped under two different indexes based on the workflow instance with which the logs are associated. Also logs of different microservices, such as "config_ui_api" and "customer_db_api", executed by the workflow named "ReadAllExpressSolutions" are grouped under a single tab in "Index1" and different microservices, such as "scan_ui_api" and "config_ui_api" executed by the workflow named "LivenessCheck" are grouped under a single tab in "Index2". The tracking identifiers may be used as user-friendly keywords to search through the logs and obtain logs associated with a workflow instance. Although FIGS. 3A to 3C shows examples of aggregation and processing of logs from three microservices and two workflows, in other examples, logs from more than two workflows and more than three microservices may be aggregated and processed in a similar manner.

Turning back to FIG. 2, the rule engine 212 may access the processed logs in the log analysis and search engine 206. The rule engine 212 includes predefined rules for analyzing the processed logs. In an example, the rule engine 212 includes a set of rules for each microservice. The rule engine 212 may be a repository of rules and may include instructions for applying the predefined rules for each microservice. The rule engine may be implemented within a container or group of containers within a pod. The rules may be added in the rule engine 212 by a user. The rule engine 212 may include individual directories for each microservice. For adding a rule for a particular microservice, the rule is stored in a directory of that microservice. To add a rule applicable to more than one microservice, the rule may be stored in an orchestration directory. In an example, the rule may be a set of instructions written in a programming language such as "python".

In an example, the rules may be stored inside a module with an extension "_rules.py". The rules may be defined as a function with an extension "_rule". The function ingests a list of logs and returns either a list of flagged logs or an empty list if no logs are flagged. The flagged logs refer to logs which are in violation of the rule defined by the function. In an example, the rules may also be imported from the other microservice directories. In an example, the rules function may include a "query_strings" attribute to the function using the form "<function_name>.query_strings". The attribute refers to a dictionary, where the keys correspond to fields in the logs, and the values are a list of strings that are present in the logs from the error scenario the rule targets. In an example, the "Config_ui_api no_docs_rule" may flag logs that contain the field "status.code" with value "NO_DOCS", so the "query_strings attribute is: no_doc_rule.query_strings={"status.code":["NO_DOCS"]}.

A rule for a microservice, say "Config_ui_api", for "Connection Refused" scenario may be defined as described herein. In an example, the rule is defined as a function, such as "connection_refused_rule(logs):" inside the module "connection_refused_rules.py". The input to the function "connection_refused_rule(logs):" may be defined as "[log1, log2, log3, . . . ]" and a return type of the function is defined as "Return type: [ ] or [flog1, flog2, flog3, . . . ]". A function parameter may be defined in the format: "connection_refused_rule.query_strings={"message": [".url.", ".connect.", ".http."]}".

The rule engine 212 may analyse the index of processed logs based on the set of rules predefined for each of a plurality of services associated with the workflow instance. Based on the analysis, the rule engine 212 may further identify an error in execution of the workflow instance. For example, in response to identifying the error, the rule engine 212 may generate an error description, an error reason, and a corrective action associated with the error. The error description provides an explanation of the error and the error reason outlines a probable reason of the error. The error reason and corrective action may be predefined and mapped with the error description. The corrective action represents a suggestive action that may be carried out to address the error. Example of error identification is shown below. The rule engine 212 may generate the results of identification of errors in a json format, such as illustrated in table 1 below.

TABLE 1

| Connection Refused Rule: | | |
| --- | --- | --- |
| Error Description | Error Reason | Corrective Action |
| A connection refused error was found after a request to another service | The "Config_UI_API" service had an issue communicating with another service | Check the pod status of the other service and its error logs |

TABLE 2

| Template Rendering Rule: | | |
| --- | --- | --- |
| Error Description | Error Reason | Corrective Action |
| Detected an error in rendering the provided template | Provided template was incorrect | Nothing - Error was due to incorrect input format |

Table 1 and table 2 shown above, lists error description, error reason, and corrective action for two different microservices which may be executed during a single workflow instance. Table 1 shows error description, error reason, and corrective action for a "connection refused" rule and table 2 shows error description, error reason, and corrective action for a "template render" rule. When the rule engine 212 identifies an error, based on the analysis, a table similar to the tables 1 and 2, as illustrated above, may be rendered by the rule engine 212. In an example, the rule engine 212 may periodically analyze the logs from the microservices 1 and 2 and identify errors based on the analysis. For example, the rule engine may be configured to analyze logs from the microservices 1 and 2 for a definite time period. Further, the rule engine may receive a query from a user, where the query is indicative of a tracking identifier. In an example, the tracking identifier may be "LivenessCheck42" linked to all logs associated with the workflow for biometric/facial recognition having an instance identifier "2662f0c41859cbcb0d0a9a354cfe87d5". On processing the query with the tracking identifier "LivenessCheck42", the rule engine 212 may generate a list of error report for all the logs associated with the workflow instance. In an example, the rule engine 212 may analyze the logs based on the rules defined for microservices 1 and 2. Thus, a user may filter the logs based on tracking identifier and obtain error reports for microservices invoked throughout the transactions or processed in the entire workflow instance. Based on the error report for the entire workflow instance, the user may debug the workflow instance from end to end. For example, the user may refer to the error description, error reason, and corrective action mentioned in the error report and perform debugging operations.

Figure 4:
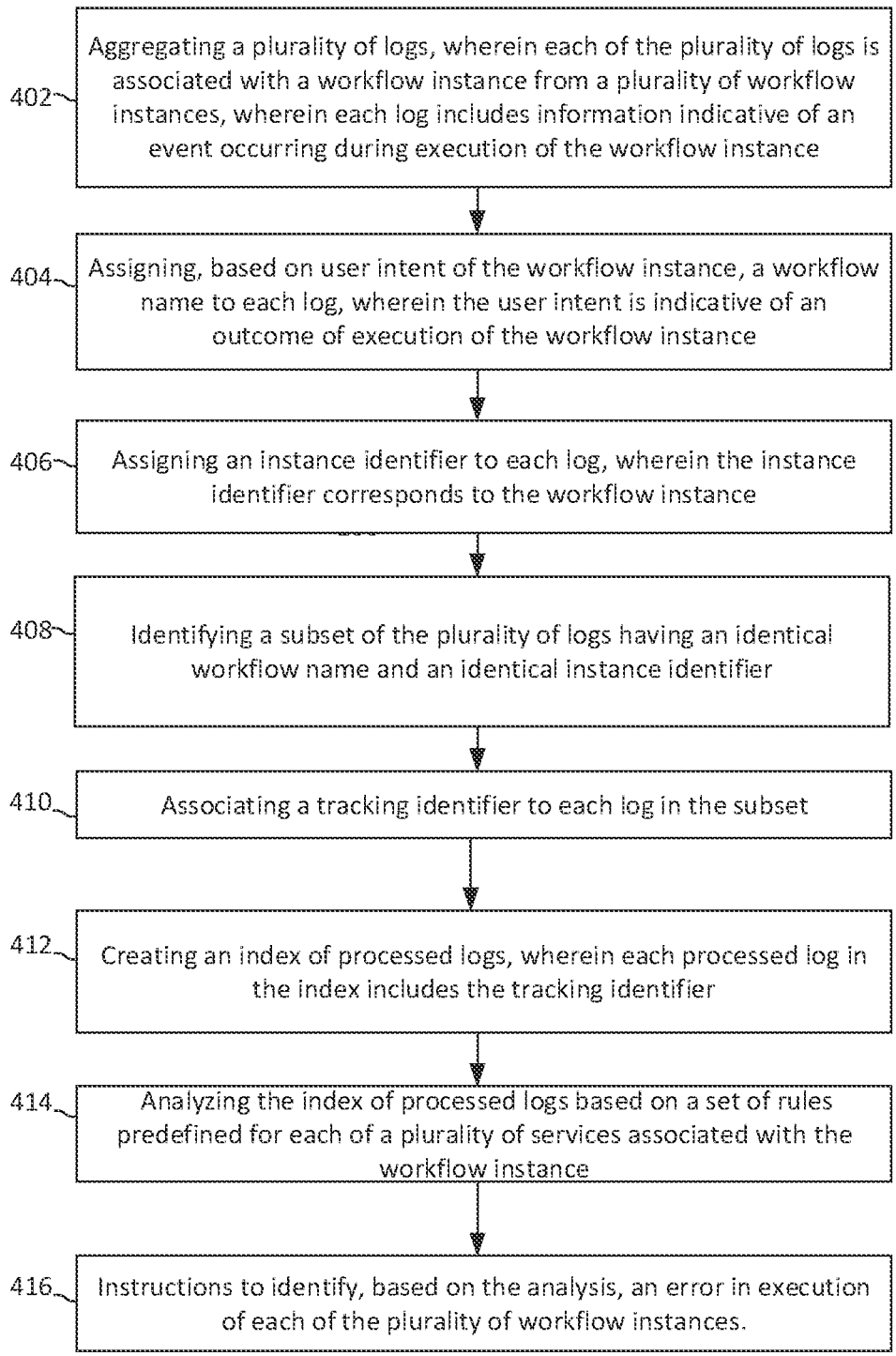
FIG. 4 illustrates a flowchart for a method for debugging workflows, according to some examples.

FIG. 4 illustrates a flowchart for a method 400 for debugging workflows. Method 400 may be executed as one or more instructions on a machine (e.g., by at least one processor), where the one or more instructions are included on at least one machine-readable storage medium (e.g., a non-transitory machine readable-storage medium). Although the blocks in method 400 are shown in an order, blocks depicted in FIG. 3, may be performed in any order and at any time. Also, some of the blocks shown in method 400 may be omitted without departing from the spirit and scope of this disclosure. Method 400 may be implemented on a computing system according to any of the examples herein.

At block 402, a computing system, such as the computing system 100 of FIG. 1, may aggregate a plurality of logs, where each of the plurality of logs is associated with a workflow instance. The log may represent a computer file that records events occurring during execution of instructions in a device. In some examples, the log may originate from an application or a microservice hosted in a computing cluster. The system 100 may aggregate the logs from a plurality of workflow instances. The workflow instances may include instances of a single workflow or instances of different workflows. Each of the logs include information indicative of an event occurring during execution of an workflow instance. The events may include transactions between an application or microservice, etc., and the users. The events collected in the log may include the type, content, or time of the transactions made by a user from a terminal with that microservice or application. Examples of the events may include error messages, completion messages, installation successful messages, transaction information between the microservices, etc. Aggregating the logs may include storing the logs in a centralized distributed database accessible by the computing system 100.

At block 404, the computing system may assign a workflow name to the log based on user intent of the workflow instance. The user intent is indicative of an outcome of execution of the workflow instance. In an example, user intent refers to a business outcome associated with the workflow instance. The workflow name allows logs of different workflows to be distinguished from one another.

At block 406, the computing system assigns an instance identifier to the log, where the instance identifier corresponds to the workflow instance. For example, when a workflow is initialized for the first time, a first workflow instance may be running. In an example with reference to the workflow to open a new customer account, the first invoked workflow instance may be assigned an instance identifier "1".

At block 408, the computing system identifies a subset of the plurality of logs having an identical workflow name and an identical instance identifier. The subset of logs include logs that may be generated as part of a single transaction, i.e., which are generated by a single instance of a particular workflow. Identification of the subset of logs enables stitching together logs referring to a particular transaction or process that invokes a single instance of a particular workflow. These logs may include information relating to events occurring during execution of a single instance of a particular workflow.

At block 410, the computing system 100 associates a tracking identifier to each log in the subset of logs. The tracking identifier may be a universally unique identifier (UUID) used to differentiate logs of one subset from logs of another subset. The tracking identifier may be a user-friendly name associated with the subset of logs. The user-friendly name may be alpha-numeric.

At block 412, the computing system 100 creates an index of processed logs, where each processed log in the index includes the tracking identifier. The index of processed logs refers to a collection of the subset of logs. Thus, for each subset of logs there may be a separate index of processed logs. The index of processed logs is grouped using the tracking identifier. Each index of processed logs may be identified by a single tracking identifier that is common for all logs in the index.

At block 414, the computing system analyzes the index of processed logs based on a set of rules predefined for each of a plurality of services associated with the workflow instance. Each of the applications/services/microservices that may be executed while running of the workflow instance may have a set of rules for error checking. If workflow instance invokes multiple microservices during execution, a set of rules corresponding to each of those microservices is used for analyzing the processed logs. Based on the analysis, at block 416, the computing system may identify an error in execution of each of the plurality of workflow instances.

Figure 5:
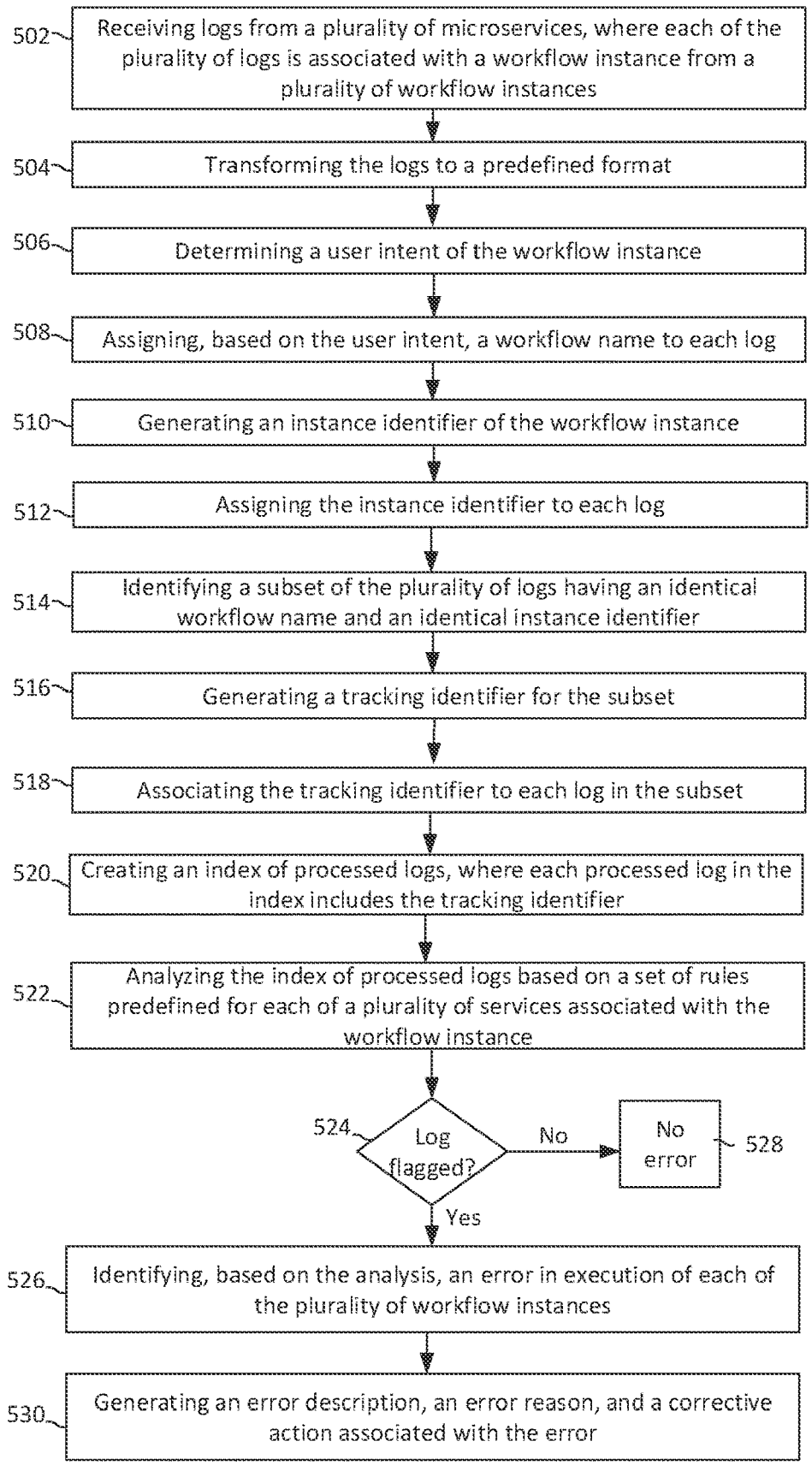
FIG. 5 illustrates a flowchart for another method for debugging workflows, according to some examples.

FIG. 5 illustrates a flowchart for a method 500 for debugging workflows. Method 500 may be executed as one or more instructions on a machine (e.g., by at least one processor), where the one or more instructions are included on at least one machine-readable storage medium (e.g., a non-transitory machine readable-storage medium). Although the blocks in method 500 are shown in an order, blocks depicted in FIG. 4, may be performed in any order and at any time. Also, some of the blocks shown in method 500 may be omitted without departing from the spirit and scope of this disclosure. Method 500 may be implemented on a computing system according to any of the examples herein.

At block 502, the system receives logs from multiple microservices. In an example, the microservices may be invoked in a single workflow instance. In an example, the microservices may be running in dedicated containers hosted in one or more pods in a computing cluster, such as a kubernetes cluster. The microservices may include APIs for connecting to other microservices during execution of the workflow instance. At block 504, the logs may be passed through a data filter and transformed into a predefined format. For example, the filters may parse unstructured log data and transform into structured and queryable formats.

At block 506, a user intent of the workflow instance may be determined. In an example, the user intent may be determined from a user input to the workflow instance. The user intent is indicative of an outcome of execution of the workflow instance. At block 508, the system assigns, based on the user intent of the workflow instance, a workflow name to the log.

At block 510, the system generates an instance identifier for the workflow instance. The instance identifier uniquely identifies the workflow instance from other workflow instances. The instance identifier may be a randomly generated UUID. At block 512, the instance identifier is assigned to the log. All logs originating from a single workflow instance are associated with an identical instance identifier.

At block 514, the system identifies a subset of the plurality of logs having an identical workflow name and an identical instance identifier. Thus, logs having an identical workflow name and an identical instance identifier are grouped in the subset. At block 516, a tracking identifier is generated for the subset. In an example, the tracking identifier may be associated with each of the logs in the subset. At block 518, the tracking identifier is associated with the subset.

At block 520, the system creates an index of processed logs, where each processed log in the index includes the tracking identifier. At block 522, the system analyzes the index of processed logs based on a set of rules predefined for each of a plurality of services associated with the workflow instance. Based on the analysis, the system may flag one or more logs which are erroneous. In an example, the system may read error messages embedded in the logs to identify the erroneous logs. At block 524, the system checks whether any of the logs is flagged.

If one or more logs is flagged (Yes' branch from block 524), the system identifies an error in execution of each of the plurality of workflow instances at block 526. If no log is flagged (No' branch from block 524), the system determines that there are no errors in the logs, at block 528. In response to identifying the error, at block 530 the system generates an error description, an error reason, and a corrective action associated with the error.

FIG. 6 depicts a block diagram of an example computer system 600 in which the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 508 or other static storage device coupled to bus 602 for storing static information and instructions for processor 604. A storage device 610, such as a magnetic disk, optical disk, or USB thumb drive (Flash drive), etc., is provided and coupled to bus 502 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 500 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for debugging workflows executing on a plurality of computing devices, comprising:
  aggregating, by a log aggregator container, a plurality of logs originated from containers of different microservices, wherein each of the plurality of logs is associated with a workflow instance from a plurality of workflow instances, wherein each log includes information indicative of an event occurring during execution of the associated workflow instance on a corresponding computing device;
  assigning, by a log manager container, based on user intent of the workflow instance, a workflow name to each log, wherein the user intent is indicative of an outcome of execution of the workflow instance on the corresponding computing device;

assigning an instance identifier to each log, wherein the instance identifier corresponds to the workflow instance;

identifying a subset of the plurality of logs having an identical workflow name and an identical instance identifier;

associating a tracking identifier to each log in the subset;

creating an index of processed logs, wherein each processed log in the index includes the tracking identifier;

analyzing the index of processed logs based on a set of rules predefined for each of a plurality of services associated with the workflow instance; and identifying, based on the analysis, an error in execution of each of the plurality of workflow instances on the plurality of computing devices.

2. The method of claim 1, further comprising, in response to identifying the error, generating an error description, an error reason, and a corrective action associated with the error.

3. The method of claim 1, further comprising, wherein the aggregating comprises, converting each log into a predefined format.

4. The method of claim 1, further comprising, generating, based on a query indicative of the tracking identifier, an error report for the subset of the plurality of logs from the index of processed logs.

5. The method of claim 1, wherein each log originates from a microservice hosted in a computing cluster.

6. The method of claim 5, wherein the computing cluster is a Kubernetes cluster.

7. The method of claim 1, further comprising rendering an error report indicative of errors associated with each of a plurality of services in the workflow instance.

8. A computing system comprising:
a processor; and
a memory coupled to the processor, the memory storing instructions executable by the processor to:
aggregate, by a log aggregator container, a plurality of logs originated from containers of different microservices, wherein each of the plurality of logs is associated with a workflow instance from a plurality of workflow instances, wherein each log includes information indicative of an event occurring during execution of the workflow instance on a corresponding computing device;
assign, by a log manager container, based on user intent of the workflow instance, a workflow name to each log, wherein the user intent is indicative of an outcome of execution of the workflow instance on the corresponding computing device;
assign an instance identifier to each log, wherein the instance identifier corresponds to the workflow instance;
identify a subset of the plurality of logs having an identical workflow name and an identical instance identifier;
associate a tracking identifier to each log in the subset;
create an index of processed logs, wherein each processed log in the index includes the tracking identifier;
analyze the index of processed logs based on a set of rules predefined for each of a plurality of services associated with the workflow instance; and
identify, based on the analysis, an error in execution of each of the plurality of workflow instances on the plurality of computing devices.

9. The computing system of claim 8, wherein the processor is further to generate an error description, an error reason, and a corrective action associated with the error, in response to identifying the error.

10. The computing system of claim 8, wherein to aggregate the plurality of logs, the processor is further to convert each log into a predefined format.

11. The computing system of claim 8, wherein the processor is further to generate, based on a query indicative of the tracking identifier, an error report for the subset of the plurality of logs from the index of processed logs.

12. The computing system of claim 8, wherein each log originates from a microservice hosted in a computing cluster.

13. The computing system of claim 12, wherein the computing cluster is a Kubernetes cluster.

14. The computing system of claim 8, further comprising rendering an error report indicative of errors associated with each of a plurality of services in the workflow instance.

15. A non-transitory computer-readable medium comprising computer-readable instructions, the computer-readable instructions when executed by a processor, cause the processor to:
aggregate, by a log aggregator container, a plurality of logs originated from containers of different microservices, wherein each of the plurality of logs is associated with a workflow instance from a plurality of workflow instances, wherein each log includes information indicative of an event occurring during execution of the workflow instance on a corresponding computing device;
assign, by a log manager container, based on user intent of the workflow instance, a workflow name to each log, wherein the user intent is indicative of an outcome of execution of the workflow instance on the corresponding computing device;
assign an instance identifier to each log, wherein the instance identifier corresponds to the workflow instance;
identify a subset of the plurality of logs having an identical workflow name and an identical instance identifier;
associate a tracking identifier to each log in the subset;
create an index of processed logs, wherein each processed log in the index includes the tracking identifier;
analyze the index of processed logs based on a set of rules predefined for each of a plurality of services associated with the workflow instance; and
identify, based on the analysis, an error in execution of each of the plurality of workflow instances on the plurality of computing devices.

16. The non-transitory computer-readable medium of claim 15, wherein the computer-readable instructions when executed by the processor, further cause the processor to generate an error description, an error reason, and a corrective action associated with the error, in response to identifying the error.

17. The non-transitory computer-readable medium of claim 15, wherein the computer-readable instructions to aggregate the plurality of logs when executed by the processor, further cause the processor to convert each log into a predefined format.

18. The non-transitory computer-readable medium of claim 15, wherein the computer-readable instructions when executed by the processor, further cause the processor to generate, based on a query indicative of the tracking identifier, an error report for the subset of the plurality of logs from the index of processed logs.

19. The non-transitory computer-readable medium of claim 15, wherein each log originates from a microservice hosted in a computing cluster.

20. The non-transitory computer-readable medium of claim 19, wherein the computing cluster is a Kubernetes cluster.

\* \* \* \* \*